Sept. 18, 1962 D. J. STEINBERG 3,054,708
PROTECTION OF POLISHED METALLIC SURFACES
Filed Feb. 23, 1960
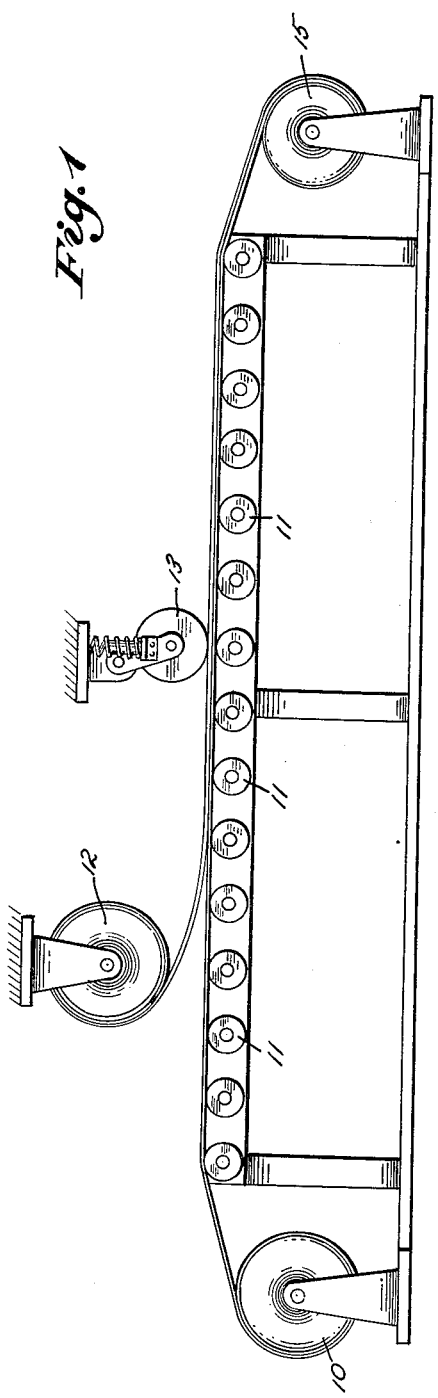
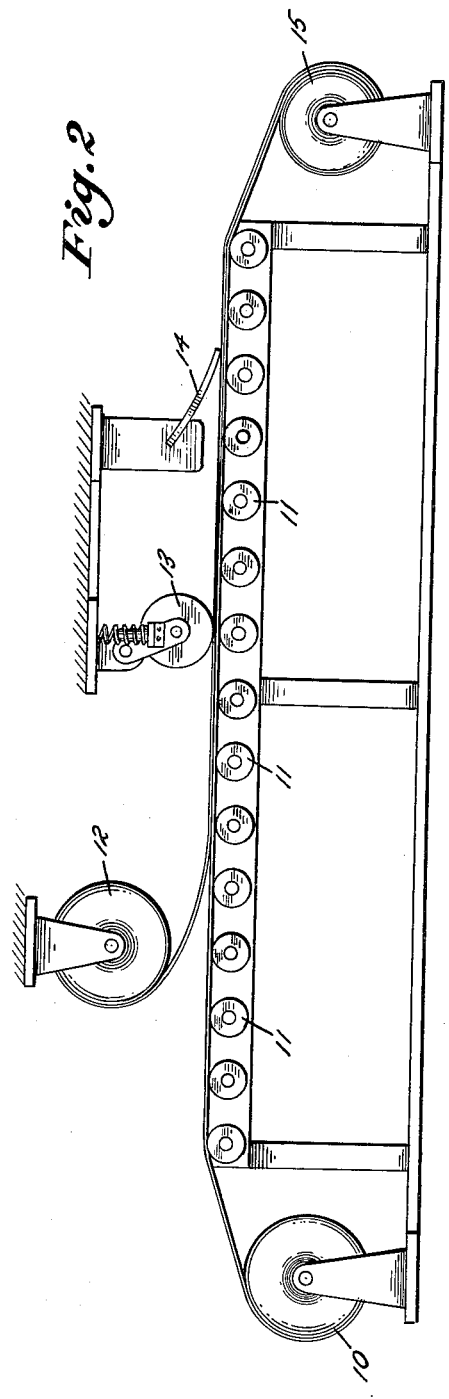

United States Patent Office 3,054,708
Patented Sept. 18, 1962

3,054,708
PROTECTION OF POLISHED METALLIC
SURFACES
David J. Steinberg, West Englewood, N.J., assignor, by
mesne assignments, to Metal Skin Corporation, Englewood, N.J., a corporation of New Jersey
Filed Feb. 23, 1960, Ser. No. 10,137
5 Claims. (Cl. 156—1)

This invention relates generally to the field of protective coatings or coverings, and more particularly, to the protection of polished metal surfaces of objects upon which subsequent machining or forming operations are performed.

The problem of protecting such surfaces has greatly increased in recent years with the wide use of stamping and bending of pre-plated sheet metallic stock used in the sheet metal fabrication of household appliances and the like. Such techniques are particularly useful where the cost of fabrication must be maintained at a very low level, and to achieve low manufacturing costs, it is essential that any protective coating applied to the plated or finished surface of the raw material be applied as a continuous process, and readily removed by hand without resort to special tools, solvents or the like.

It is known in the art to protect finished surfaces by spraying suspensions of rubbery synthetic resins or asphaltic products, and allowing the carrier to evaporate, whereby a layer of the protective substances is deposited upon the surface. The principal disadvantage in using techniques of this type lies in the time consumed in spraying the surface, as well as the drying time prior to performing operations upon the protected material, and the necessity for removing the protective film through the use of solvents or abrasion.

In the alternative, attempts have been made to dip the surface to be protected into such substances as synthetic latex, vinyl aromatic hydrocarbons, ethyl cellulose, polyvinyl alcohol, shellac, but all of the above have required substantial time in application and removal.

In an attempt to avoid the above difficulty, considerable use has been made of gummed or pressure-sensitive paper tape, in spite of its high cost, which is almost prohibitive. The principal difficulty encountered with such materials is the tendency to leave a deposit of the adhesive upon the protected surface after the protective tape has been peeled from the protected surface. This requires subsequent removal using solvents and/or abrasion.

It is therefore among the principal objects of the present invention to provide a suitable protective material of the class described in which the above mentioned disadvantages have been substantially eliminated.

Another object of the invention lies in the provision of an improved method for applying a protective coating or cover to a finished metallic surface in which the use of an adhesive has been completely eliminated.

Still another object of the invention lies in the provision of a synthetic resinous flexible planar sheeting material capable of retaining a static electric charge, whereby the same may adhere itself to a metallic surface to be protected by static electrical attraction sufficient to resist the effect of normal handling, but which may be readily peeled from the protected surface without difficulty, and without resort to other than ordinary skill.

A further object of the invention lies in the provision of a method for protecting finished metallic surfaces in which the cost of material, application and removal may be of an order substantially less than any method known and used in the prior art.

Still another object of the invention lies in the provision of a protective material which may be printed on at least one surface thereof, thereby permitting an advertising medium, or in the alternative, means for carrying other indicia.

A feature of the invention lies in the fact that the method may be incorporated into existing techniques employed in packaging raw material having finished surfaces, without extensive modification of equipment presently in use.

Another feature of the invention lies in the fact that certain of the materials which may be used as protective film, are of a transparent or translucent nature, thereby permitting visual inspection of the protected surface after the application of the protective film.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a schematic view showing an embodiment of the invention.

FIGURE 2 is a schematic view showing an alternate form of the embodiment.

In accordance with the invention, the method contemplates the application to a finished metallic surface of a flexible tough sheeting capable of retaining a high electrostatic charge so that the same may be electromagnetically attracted to the surface to be protected. Such materials may include impregnated paper, and suitable synthetic resinous materials having molecular structure which lends itself to the retention of high static charges. The electrostatic charge is placed upon the material at the time it is spooled for subsequent dispensing upon the surface of the material to be protected, or may be imparted to the material simultaneously with the application of the material to the surface to be protected. While a variety of materials exhibit this property, I have found polyvinylidene chloride, also known as 1,1-dichloro ethylene to be very superior in this respect. This material is available commercially in sheet form, or where paper is employed, liquid vinylidene chloride may be impregnated into the paper and polymerized in situ.

Referring to FIGURE 1 in the drawings, there is shown a typical installation for the application of a protective sheet to a roll of sheet metal indicated by reference character 10, the outer surface, at least, of which has been plated or otherwise finished. The metal is moved over a plurality of horizontally disposed rollers 11 which support the metal in a plane. A roll of protective sheet material 12 is supported above the surface of the metal and is fed to the upper surface of the metal by means of a roller 13 under pressure. In the case of the application illustrated in FIGURE 1, the material 12 has been previously charged at the time it was spooled, so that no subsequent application of charge is necessary, and the material will readily adhere to the metal 10 as it is rolled into contact. The roller 13 is preferably provided with a surface which is non-metallic in nature, so that if charged, it will be in such condition as to normally repel the material 12, rather than attract the same.

After application, as described above, the laminated metal and protective sheet may be fed to a takeup roller 15 wherein the metal is again re-packaged for shipment and subsequent use. The protective material 12 will normally adhere to the metal 10 during processing operations, and upon the completion of such operations, it is necessary only to manually strip the protective material from the protected surface. As no adhesive has been employed during the application of the protective material, the protected surface, will, upon removal of the protective material, exhibit a clean, unmarred appearance requiring no further treatment.

In the alternate method of application, shown in FIGURE 2, there is provided an additional static wiper 14 which generates an additional or initial charge upon the protective material, this structure being required where no initial charge has been imparted to the material at the time of manufacture or initial spooling.

I wish it to be understood that I do not consider the invention limited to the precise details of structure shown and set forth in this specification, for obvious modifications will occur to those skilled in the art to which the invention relates.

I claim:

1. The method of temporarily protecting finished metallic surfaces, which comprises: (1) providing a flexible sheet of planar polyvinylidene chloride material capable of retaining a static electric charge; (2) contacting at least one surface of said material to generate a statical electrical charge upon said material; (3) applying said charged sheet to the surface to be protected under pressure.

2. The method of temporarily protecting finished metallic surfaces, which comprises: (1) providing a flexible sheet of planar polyvinylidene chloride material capable of retaining a static electric charge; (2) contacting at least one surface of said material to generate a statical electrical charge upon said material; (3) rolling said charged sheet upon the surface to be protected under pressure.

3. The method of temporarily protecting finished metallic surfaces, which comprises:
   (a) providing a metallic sheet having a finished surface;
   (b) providing a flexible sheet of planar synthetic resinous material capable of retaining a static electrical charge;
   (c) contacting at least one surface of said material to generate a static electric charge upon said material; and
   (d) applying said charged sheet to the surface to be protected, under pressure.

4. The method of temporarily protecting finished metallic surfaces, which comprises:
   (a) providing a metallic sheet having a finished surface;
   (b) providing a flexible sheet of planar polyvinylidene chloride material capable of retaining a static electrical charge;
   (c) contacting at least one surface of said material to generate a static electric charge upon said material; and
   (d) applying said charged sheet to the surface to be protected, under pressure.

5. The method of temporarily protecting finished metallic surfaces, which comprises:
   (a) providing a metallic sheet having a finished surface;
   (b) providing a flexible sheet of planar polyvinylidene chloride material capable of retaining a static electrical charge;
   (c) contacting at least one surface of said material to generate a static electric charge upon said material; and
   (d) rolling said charged sheet upon the surface to be protected, under pressure.

References Cited in the file of this patent

UNITED STATES PATENTS

| | | |
|---|---|---|
| 2,551,035 | Miller | May 1, 1951 |
| 2,919,059 | Sporka | Dec. 29, 1959 |